United States Patent

Looverie et al.

[11] Patent Number: 5,915,745
[45] Date of Patent: Jun. 29, 1999

[54] REINFORCEMENT STRIP

[75] Inventors: Alois Looverie, Moen; Paul Timperman, Zwevegem, both of Belgium

[73] Assignee: N.V. Bekaert S.A., Zwevegem, Belgium

[21] Appl. No.: 08/602,798

[22] PCT Filed: Jul. 14, 1995

[86] PCT No.: PCT/EP95/02817

§ 371 Date: May 7, 1996

§ 102(e) Date: May 7, 1996

[87] PCT Pub. No.: WO96/02714

PCT Pub. Date: Feb. 1, 1996

[30] Foreign Application Priority Data

Jul. 18, 1994 [BE] Belgium ................................ 9400675

[51] Int. Cl.$^6$ ................................................. B21D 28/10
[52] U.S. Cl. ........................ 29/429; 52/693; 52/694; 52/730.2; 52/745.19
[58] Field of Search .................... 52/693, 694, 442, 52/426, 427, 309.11, 309.12, 309.14, 309.17, 379, 504, 745.19, 745.2, 729.1, 730.2; 29/897.3, 897.31, 897.312, 897.34, 429, 430

[56] References Cited

U.S. PATENT DOCUMENTS

| | | |
|---|---|---|
| 1,646,974 | 10/1927 | Moyer . |
| 3,183,628 | 5/1965 | Smith ..................................... 52/442 X |
| 3,961,738 | 6/1976 | Ollman . |
| 4,227,359 | 10/1980 | Schlenker . |
| 4,869,038 | 9/1989 | Catani . |

FOREIGN PATENT DOCUMENTS

| | | |
|---|---|---|
| 181055 | 2/1966 | Austria . |
| 1060577 | 7/1959 | Germany ................................ 52/694 |
| 2738292 | 1/1979 | Germany . |
| 7208124 | 12/1972 | Netherlands . |
| 610406 | 10/1948 | United Kingdom . |
| 1403181 | 8/1975 | United Kingdom . |

*Primary Examiner*—Carl D. Friedman
*Assistant Examiner*—Timothy B. Kang
*Attorney, Agent, or Firm*—Shlesinger, Arkwright & Garvey LLP

[57] ABSTRACT

Grid-shaped reinforcement strip is configured for reinforcing masonry joints, and includes at least one substantially straight elongated reinforcement wire having a substantially rectangularly cross section. There is a further reinforcement wire having a substantially rectangular cross section that is spaced apart from the at least one reinforcement wire. At least one connecting wire extends between opposed faces of such at least two spaced apart reinforcement wires. An unflattened weld attaches the at least one connecting wire to respective ones of opposed faces of such at least two reinforcement wires. The connecting wire preferably has a substantially round cross section, and the thickness of the at least one connecting wire is as thick or less thick than the thickness of the at least two reinforcement wires. The sizes and materials of such reinforcement wires and connecting wire may be selected so that the reinforcement wires have tensile strengths and load-carrying capacities greater than the tensile strength and load-carrying capacity of the connecting wire. In addition, the reinforcement strip may be made sufficiently flexible so that it may be rolled up into a roll for shipping and then unrolled into a substantially flat form when ready for use.

17 Claims, 1 Drawing Sheet

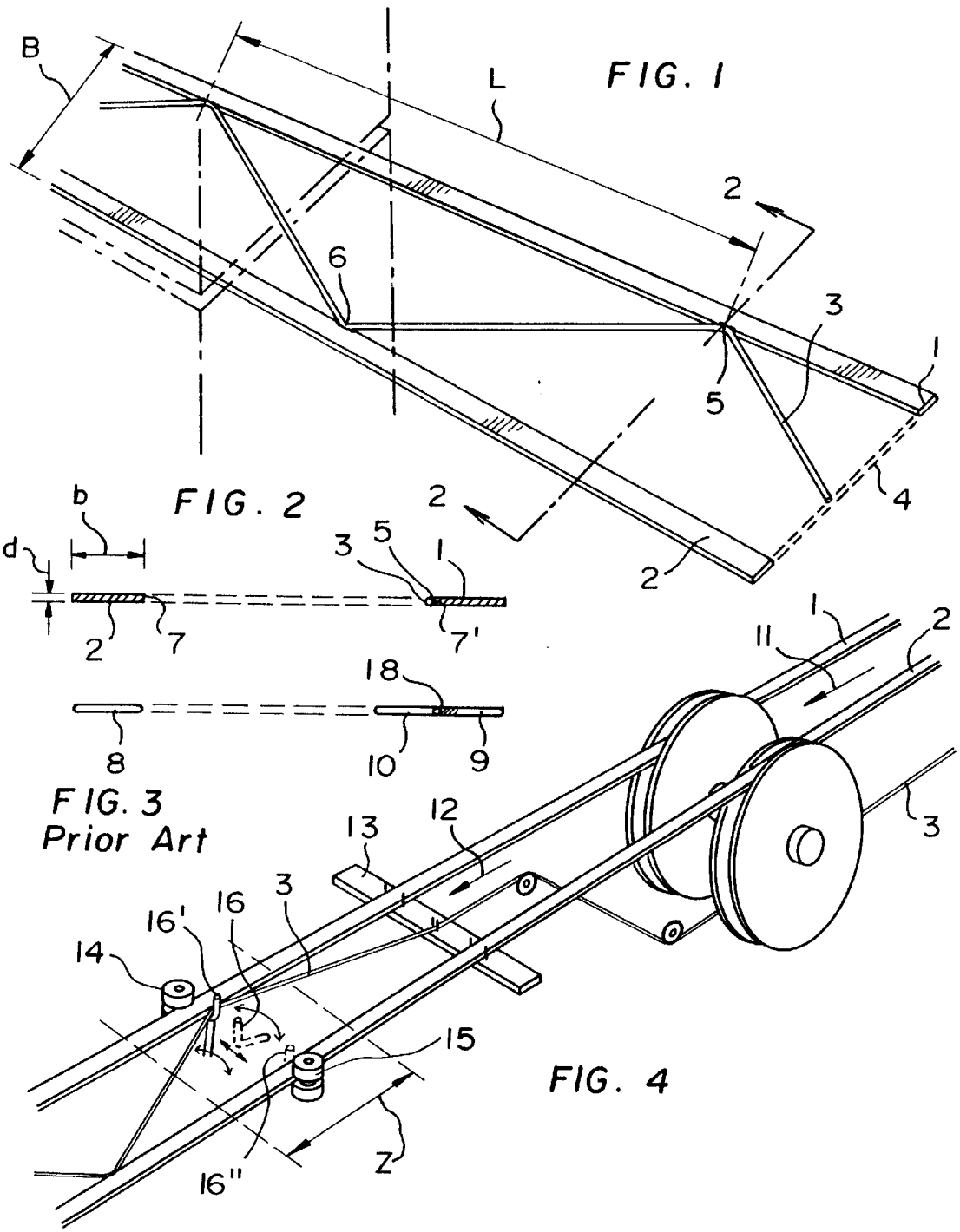

REINFORCEMENT STRIP

FIELD OF THE INVENTION

The invention relates to a grid-shaped reinforcement strip adapted for reinforcing horizontal masonry joints. Grid-shaped here means a mesh structure of steel wires of any cross-sectional shape whatsoever which are welded to one another.

BACKGROUND, OBJECTS AND SUMMARY OF THE INVENTION

In masonry construction, consecutive horizontal rows of building stones are laid on top of one another. After a row is completed in this process, a layer of binding cement, such as mortar or adhesive, is spread over its top side. A reinforcement strip is then laid on top of this layer, and then a layer of binding cement is again spread over the top side of this reinforcement strip such that the two layers then flow into one another through the mesh of the grid, which results in the creation of one single layer of binding cement with the reinforcement strip imbedded in it. The following row of building stones is then laid on top of this, such that a horizontal joint is created between the previous and the subsequent row of building stones. This joint is thus reinforced against the development of vertical cracks which would tend to run through this joint. If the row of building stones is longer than the length of one reinforcement strip, then of course more reinforcement strips are laid end to end with a certain amount of overlapping to assure the continuity of the reinforcement. Care is then taken that the breaks in the reinforcement strips in successive joints be then situated so as to be staggered in relation to one another.

In order to be adapted for the reinforcement of such horizontal masonry joints, such strips have a breadth of approximately 0.6 to 0.9 times the thickness of the wall they are intended to reinforce, which means a breadth on the order of between 3 cm and 30 cm, and usually between 5 cm and 18 cm. A practical length for ease of handling on the work site is in the range between 2 and 7 meters. In general, they are completely flat, but this does not mean they cannot contain indentations projecting outside this flat plane, which could then fit into the cavity of the wall or into vertical openings in or between the building stones. Further, in order to be adapted for the reinforcement of horizontal masonry joints, the mesh structure of the strip needs to be open enough to permit the mortar, adhesive or other binding cement sufficiently to flow through the grid when the building stones are laid, in such a manner that, in the joint between the two adjacent rows of building stones, a single layer of binding cement can be formed, that joins the two rows of building stones with one another and in which the structure is embedded. And finally, in order to be adapted for the reinforcement of horizontal masonry joints, a number of the steel wires which are part of the mesh structure, must each run straight in the longitudinal direction from the one longitudinal end of the strip to the other, have a cross-section ranging between 6 and 20 $mm^2$ and a steel tensile strength of more than 450 $N/mm^2$. These are the reinforcement wires. The remaining wires of the grid then serve to join together these longitudinally running reinforcement wires into a single piece in the form of a grid-shaped strip. The whole of these remaining wires is here called the steel wire connecting structure. This connecting structure can take on a great variety of different forms, for example consisting of a number of separate cross-wires which are welded to the reinforcement wires on both sides to form a ladder structure or, by preference, consisting of one single zigzag wire, as will be given as an example below. Viewed separately, without the reinforcement wires, this connecting structure can thus in and of itself form either a number of interconnected units, or a collection of separate wires. The invention will not be limited to any specific embodiment of this connecting structure, although the embodiment as one single zigzag wire will be the preferred embodiment.

A usual embodiment for such a grid-shaped reinforcement strip is the one in which the strip contains two straight and continuous steel reinforcement wires with round cross section, running in parallel in the longitudinal direction of the strip and at a distance from each other and forming the side edges of the strip, both thus adjacent reinforcing wires being connected with one another by means of a steel wire connecting structure which is spot welded on both sides to the mutually facing sides of said adjacent reinforcement wires. This connecting structure consists preferably of one single continuous steel wire with a round cross-section, which runs from the one longitudinal end of the strip to the other in a V-shaped zigzag line running back and forth from one contact location on the inner side of one of the two adjacent reinforcement wires to a contact location on the inner side of the other adjacent reinforcement wire, in which the wire is spot welded at the successive contact locations to the respective reinforcement wires. Here, the inner side of a reinforcement wire is the side which faces the adjacent reinforcement wire. By preference, the reinforcement wires are knurled to effect good adhesion with the binding cement. In such case, the wires in this strip have a diameter in the range of from 3 to 4 mm. Since the zigzag wire, or more generally the steel wire connecting structure, is spot welded on the inner sides of the reinforcement wires and not on the upper or under sides, the thickness of the strip is equal to the diameter of the wires.

In order to make it possible to obtain masonry with thinner joints, a method is known from GB 1 403 181 where such strips, after welding the wires with round cross-section, are rolled into a flattened shape. A reinforcement strip is thus obtained in which the zigzag wire and the two reinforcement wires of the strip have been flattened in the plane of the strip to a thickness which can be less than 1.75 mm and with a thickness-breadth ratio which can be less than 0.3.

The aim of the invention is to provide a reinforcement strip, also with a flattened shape but with a structure, which offers a number of advantages and further, although not limited thereto, is suitable for being made in very thin form of execution, also of less than 1.75 mm and with a thickness-breadth ratio which can be less than 0.3. Here, the number of reinforcement wires in the strip need not necessarily be limited to two, and thus there can be more than two reinforcement wires present in the strip. Between each two wires of each distinguishable pair of adjacent reinforcement wires, then, there is a corresponding part of the steel wire connecting structure, which is not necessarily limited to a wire running in a V-shaped zigzag line.

In the reinforcement strip according to the invention the reinforcement wires have also a flattened shape in the plane of the strip, preferably with a thickness which is less than 1.75 mm and a thickness-breadth ratio which is less than 0.3, and this strip is further characterized by the fact that the spot welds have an unflattened structure and that said steel wire connecting structure comprises a number of steel wires having a thickness which is not greater than that of said reinforcement wires. By preference, this steel wire connecting structure consists of one single zigzag wire such as described above.

The above characteristics mean that this is a reinforcement strip which has not been made thin by means of rolling the entire piece flat, but rather by welding together what on the one hand are thin pre-flattened wires, e.g. pre-rolled bands, to serve as reinforcement wires, with what, on the other hand, are thin wires selected not to be thicker than the thickness of the bands and which serve as the connecting structure. This new concept offers a number of important advantages.

On the one hand, this concept avoids the necessity of having to roll the welds flat afterwards, which would result into flat-rolled welds with a flattened structure, i.e. the cold worked metallographic structure of a weld. In tensile-strength tests indeed of the known strips, it was observed that the breakage always occurred at such a weld, and at a tension of approximately 500 N/mm². It therefore made no sense to give the reinforcement wires a greater tensile strength than that of their weakest spots. Due to the fact that such welds are no longer present, it becomes possible to increase the tensile strength of the reinforcement wires to 600 N/mm² and more, though for manufacturing reasons not generally higher than 1000 N/mm². Moreover, the flatter the earlier strips were rolled, in order to be suitable for correspondingly thinner joints, the more cold deformation there was of the welds and thus the weaker these weak spots became. Due to this fact, the flat-rolling of the strips to thickness-breadth ratios of the originally round wires of under 0.3 was not recommended, and flatter embodiments were not normally available on the market.

On the other hand, since the pre-flattened reinforcement wires in the invention can preferably be pre-rolled wires, the possibility is opened up of using rolled wires—in a preferred embodiment—that have been counter-rolled, in which then at least the sides to which the spot welds are to be applied display a flattened, roughly straight edge, approximately perpendicular to the plane of the band, in contrast to the rounded edge of a wire that as part of a reinforcement strip has been rolled flat between two rollers. This flattened edge turns out to be very useful in preventing difficulties in the welding of very thin bands to the equally thin—or even thinner—wires of the connecting structure, when these wires have a round cross-sectional shape, as preferred. The spot welding of the rounded edge of a very thin band (under 1.75 mm) with the thin round wire of the connecting structure (also under 1.75 mm) turns out to be difficult to accomplish with a sufficiently fast welding time and without the risk of burning through the thin wire because there is too little contact surface area. Thanks to the flattened inside edge, the use of thin bands and of wires under 1.75 mm and the manufacture of thin strips having a thickness of less than 1.75 mm has become much easier, in any case under economical manufacturing circumstances.

Compared with the earlier strips, which were rolled flat as a single piece, there is yet another advantage, which relates to the wires of the connecting structure. These were rolled flat to form broad bands such as are shown in the GB patent referred to above, and due to this fact, the size of the mesh opening is diminished by a not to be disregarded percentage, and it is this mesh opening through which the binding cement makes the attachment from the lowest row of building stones to the highest row. The size of this opening becomes especially important when stones are laid with very thin joints containing very little binding cement, particularly in the technique where adhesive is used as binding cement for the attachment of smooth building stones which have been fabricated in moulds. In the concept according to the invention, however, very thin round wires can now be selected with a final diameter that is not larger than the thickness of the reinforcement wires and these thin round wires are now no longer rolled flat, which would cause them to broaden.

Finally, there is a further advantage in terms of the simplicity of fabrication when one wants to roll the strips till they are very thin. In manufacturing strips that are rolled flat as a single piece, it is difficult to flatten the wires in an economical manner, more specifically when a thickness-breadth ratio of less than 0.3 is aimed at. For this purpose, it is necessary to start rolling in several passes with rolling equipment of relatively large dimensions and relatively large pressure values. The rolling of separate round wires however into bands of very flat shape, by means of continuous multiple-pass rolling in line, with the possibility of counter-rolling in the final pass, for example with a turks head, is a sufficiently common technique in already existing and known small ordinary rolling equipment, and it is a technique that has already attained a high level of reliable quality. This technique can also be utilized for flattening the reinforcement wires in the reinforcement strips of the invention. The same holds for the preferred round wires of the connecting structure, the manufacture of which by drawing to small final diameters under economical conditions being a matter of routine. Moreover, immediately after rolling and before welding, the flat sides of the reinforcement wires can be given a knurled surface which remains unchanged in the reinforcement strip as final product. In the technique in which the strip as a single piece is rolled flat, however, the knurled surface which in some cases is introduced beforehand in the reinforcement wires is then rolled away. If one nonetheless wishes to introduce the knurling afterwards on the strip itself, then it is difficult to prevent the strips from curling up during the knurling process. The straightening of such a strip afterwards into an acceptably straight piece is sufficiently complicated for giving up the idea of knurling the welded strip. When separate flat wires are knurled however, and they curl, the technique for straightening them into a straight shape by alternate bending between relatively small straightening rollers is a simple, well known technique which does not affect the knurling. This knurling is advantageous for a better adhesion of the reinforcement wires to the binding cement.

Here the invention will now be further explained in terms of an example and with reference to a number of figures. These include:

BRIEF DESCRIPTION OF THE DRAWINGS

FIG. 1 a preferred embodiment of the invention, in which the strip comprises two reinforcement wires with a steel wire connecting structure between them which consists of one single steel wire in the form of a V-shaped zigzag line.

FIG. 2 shows the embodiment of FIG. 1 in cross-section along the line 2—2 of FIG. 1.

FIG. 3 shows an analogous cross-section of a reinforcement strip according to the aforementioned PRIOR ART.

FIG. 4 shows schematically a method by which the embodiment according to FIG. 1 can be manufactured.

DETAILED DESCRIPTION OF THE INVENTION

The reinforcement strip as shown in FIG. 1 comprises two reinforcement wires 1 and 2, between which the connecting wire 3 runs along a V-shaped zigzag line, (i.e. along a sine curve, the sides of which have been straightened to form a series of adjoining 'V's, such as can be seen in the figure). The breadth B of the strip is 10 cm, and the wavelength L of the zigzag line is 40 cm.

The reinforcement wires are continuous wires, i.e. non interrupted, and they run parallel with one another from one longitudinal end 4 to the other (outside the figure and not drawn). The cross-section of the reinforcement wires is rectangular, with the longer dimension in the plane of the strip, (i.e. in the plane in which the two parallel wires are located). The breadth b of the reinforcement wires is 8 mm and the thickness d is 1.5 mm, as can be seen in the cross-sectional figure of FIG. 2. Here, the thickness-breadth ratio of these reinforcement wires is thus equal to 0.1875. The reinforcement wires are made of carbon steel with a carbon content of 0.12% and with a tensile strength of approximately 600 N/mm$^2$. Although this is not visible in the drawing, the surface of the flat sides of the reinforcement wires 1 and 2, (i.e. the sides with aforementioned longer dimension as their breadth), comprises a number of 3 mm broad transverse impressions, one per 6 mm of length. These impressions are the knurls, which serve to improve the adhesion of the reinforcement wires to the binding cement.

The connecting wire 3 runs along aforementioned V-shaped zigzag line from one longitudinal end 4 of the strip to the other. In addition, this connecting wire 3 also runs transversely back and forth from a contact location 5 on the inner side of reinforcement wire 1 to a contact location 6 on the inner side of reinforcement wire 2, thus creating the zigzag line. The "inner side" of a reinforcement wire is therefore the thin side which is turned towards the other reinforcement wire, as is shown in FIG. 2 for the inner side 7 of reinforcement wire 2, and for the inner side 7' of reinforcement wire 1 in contact location 5. In the successive contact locations 5 and 6 which are thus created here in the form of contact points, the wire 3 is spot welded to the reinforcement wire with which it is in contact. This wire 3 is made of relatively soft steel, and can easily be drawn to a round wire of 1.5 mm diameter such that it does not exceed the thickness of the reinforcement wires. The tensile strength of the wire is approximately 100 N/mm$^2$.

FIG. 3 shows an analogous cross-section of a reinforcement strip according the aforementioned PRIOR ART. This comprises two reinforcement wires 8 and 9 and a zigzag wire 10, which originally had round cross-sections of 4 mm in diameter and which were welded together to form a strip in which the wires 8, 9 and 10 run in the same way as in FIG. 1, and in which the strip thus obtained is afterwards rolled flat as a whole into the shape which can be seen in cross-section in FIG. 3. The weld 18 by means of which the round wires have been attached to one another is thus a cold rolled weld with a flattened structure. Furthermore, all the wires, including both the reinforcement wires and the zigzag wire, have thus obtained a form which is flattened in the plane of the strip. The edges (i.e. the short sides of the flattened wires) have all been rounded outwardly in the process of being rolled flat. In the invention, however, by preference at least the inner side of the reinforcement wires has a flattened edge, in order that the spot weld at the contact point 5 (FIG. 2) should have sufficient contact surface area. In the process of flat-rolling the separate wire from beforehand, this edge is counter-rolled in the last pass so that the outward rounding created by the flat-rolling in the previous passes is again flattened. This generally results in a straight edge on the inner side, perpendicular to the plane of the strip. By preference, the outer side is also counter-rolled, so that the reinforcement wires have a rectangular cross-section.

FIG. 4 is a schematic diagram of a preferred method of manufacturing the reinforcement strip according to FIG. 1. Each of the reinforcement wires 1 and 2 has been separately rolled beforehand in a continuous process involving a number of passes in line, and in the final pass it has also been counter-rolled to form a wire with a rectangular cross-section, having a thickness of 1.5 mm and a breadth of 8 mm. A turks head can be used for this purpose. After the final pass, the wire runs through another roller which presses the knurls in the surface of the wire. The flat wires thus obtained are on large spools (not in drawing) which are continuously unrolled, each being fed at the same speed and in parallel through a straightener (not in the drawing) in the direction of the arrow 11 to a spot welding station, which in this figure is represented by the zone Z. The straighteners serve to eliminate the permanent flexure in the wires (caused by the knurling and winding-up) in order thus to provide a straight wire to be fed into the spot welding station and to obtain a straight reinforcement strip without internal bending stresses (which would cause the strip to curl). Such straighteners are sufficiently well known in wire processing technology. They comprise a number of straightening rollers, set up in such a manner that the wire which is fed through them is bent alternately in the one and then in the other direction, which results in the residual internal stresses in the wire being reduced to zero. In this application the bendings are applied in the plane perpendicular to the direction of the breadth of the wire.

The wire 3 for the steel wire connecting structure is a pre-drawn wire, i.e. already drawn before towards a round cross-section. The diameter is selected not to be greater than the thickness of the reinforcement wires, as for example 1.5 mm. This wire is also continuously rolled off a spool and fed in the direction of arrow 12 to the spot welding station. The positioning slat 13 ensures that the wires 1 and 2 are fed in parallel in a single plane with their flattened surfaces in this plane, and that wire 3 is also fed into this same plane. The wires 1 and 2 are fed through the welding station via guide rollers 14 and 15, respectively, each of which has a groove around its circumference into which the outside edge of either wire 1 or wire 2 fits, so as to hold these wires fast for the spot welding. In the spot welding station, wire 3 is fed through a guide 16, which also serves as a welding electrode. This guide is V-shaped in the plane perpendicular to the direction in which the wires 1 and 2 are fed. This guide executes a transverse back and forth movement which is synchronized with the feeding speed of the wires 1 and 2, and this results in the wire 3 being brought into contact alternately with the inner sides of reinforcement wires 1 and 2. And together with this back and forth movement, this guide also executes a rotation within its own plane and around the point of the V-shape. Thus, when in position 16' against wire 1, the one leg of the V presses the wire 3 against the inner side of wire 1, as drawn in the figure, and when in position 16" against wire 2, the other leg of the V presses the wire 3 against the inner side of wire 2. At this moment of pressing, then, a welding current is sent from this guide to the wire 1 or 2, through the contact point of wire 3 with wire 1 or 2. With this method, and in combination with the spot welding, the steel wire connecting structure is fashioned in the form of a V-shaped zigzag line.

At the outlet of the welding station, then, a continuous reinforcement strip appears which is cut into regular 3 meter lengths. These straight 3 meter strips are then laid on top of one another to form bundles of such strips, which are then packaged. For the very thin reinforcement strips, however, which have been made possible by the invention, this continuous strip can also remain uncut and be rolled up into rolls which can then be cut to the needed length when used on site.

We claim:

1. A method for the continuous production of a grid-shaped reinforcement strip, comprising the steps of:
   a) providing at least two elongated reinforcement wires having a substantially rectangular cross section defining an upper face and an adjacent side face;
   b) providing at least one connecting wire having a substantially round cross section and having a thickness being up to the thickness of a height of the side faces of the at least two reinforcement wires;
   c) feeding the at least two reinforcement wires and the at least one connecting wire substantially continuously through a spot welding station;
   d) providing a wire guide in the welding station;
   e) orienting the at least two reinforcement wires in said feeding step so that the upper faces of the at least two reinforcement wires are substantially in the same plane and have spaced opposed side faces facing each other;
   f) bending the at least one connecting wire into a zigzag pattern with the wire guide, the wire guide moving back and forth between the at least two reinforcement wires and causing the at least one connecting wire to alternately come into substantially parallel contact with the side face of one of the at least two reinforcement wires and then the other one of the at least two reinforcement wires;
   g) spot welding the connecting wire to the spaced opposed side faces of the connecting wire substantially at the moment of the substantially parallel contact; and
   h) in said spot welding step, the spot welds being provided with heights up to the height of the side faces and up to the diameter of the substantially round cross section connecting wire.

2. A method as defined in claim 1, wherein:
   a) in said step of providing at least two reinforcement wires, at least one of the reinforcement wires has a thickness less than 1.75 mm and the side face to upper face thickness-breadth ratio is less than about 0.3.

3. A method as defined in claim 1, wherein:
   a) knurling is performed on at least one of the upper faces of said at least two reinforcement wires prior to said welding step.

4. A method as defined in claim 1, wherein:
   a) in said step of providing at least two reinforcement wires only two reinforcement wires are provided.

5. A method as defined in claim 1, wherein:
   a) in said step of providing a welding station, the welding station includes an outlet;
   b) cutting the reinforcement strip transversely into lengths as the reinforcement strip exits the outlet; and
   c) after completion of said welding step, the reinforcing strip is rolled up into a roll.

6. A method as defined in claim 1, wherein:
   a) in said step of providing at least two reinforcement wires, said opposed faces of said at least two reinforcement wires are substantially flat.

7. A method as defined in claim 1, wherein:
   a) in said step of providing at least two reinforcement wires, said at least two reinforcement wires comprise only two reinforcement wires defining the outer extent of said strip.

8. A method as defined in claim 1, wherein:
   a) in said step of bending the connecting wire, the connecting wire is bent into a V-shaped zigzag pattern.

9. A method as defined in claim 1, wherein:
   a) in said step of providing at least two reinforcement wires, said at least two reinforcement wires have a tensile strength in the range of 600 to 1,000 N/mm$^2$.

10. A method as defined in claim 1, wherein:
    a) in said step of providing at least two reinforcement wires, at least one of said at least two reinforcement wires is substantially straight.

11. A method as defined in claim 1, wherein:
    a) in said step of providing at least one connecting wire, only one connecting wire is provided.

12. A method as defined in claim 1, wherein:
    a) in said step of providing at least two reinforcement wires, at least one of the reinforcement wires is steel.

13. A method as defined in claim 1, wherein:
    a) in said step of providing at least one connecting wire, at least one of the at least one connecting wire is steel.

14. A method as defined in claim 13, wherein:
    a) in said step of providing at least two reinforcement wires, at least one of the reinforcement wires is steel.

15. A method as defined in claim 1, wherein:
    a) in said step of providing at least two reinforcement wires, at least one of the adjacent faces of at least one of the reinforcement wires is substantially flat.

16. A method as defined in claim 15, wherein:
    a) in said step of providing at least two reinforcement wires, the at least one substantially flat face faces the other one of the at least two reinforcement wires.

17. A method as defined in claim 1, wherein:
    a) in said step of providing at least two reinforcement wires, the side face to upper face thickness-breadth ratio of at least one reinforcement wire is about 0.1875.

* * * * *